United States Patent [19]

Stringer et al.

[11] 3,718,037
[45] Feb. 27, 1973

[54] PAPER MACHINE TENSION TESTER

[75] Inventors: Peter Jack Eldon Crawford Stringer, Grand'Mere, Quebec, Canada; Richard Langhiam Castle Knight, Hazle Grove; Donald Gordon Waye, Old Trafford, both of England

[73] Assignee: Consolidated Paper (Bahamas) Limited, Nassau, Bahamas

[22] Filed: Nov. 23, 1970

[21] Appl. No.: 91,745

[30] Foreign Application Priority Data

Nov. 24, 1969 Canada..................068,261

[52] U.S. Cl............................73/144, 73/37, 73/159
[51] Int. Cl.........................................G01l 5/08
[58] Field of Search.........73/37, 102, 144, 159, 37.5, 73/37.6, 37.7

[56] References Cited

UNITED STATES PATENTS

| 2,453,338 | 11/1948 | Pajak | 73/159 X |
|---|---|---|---|
| 3,402,603 | 9/1968 | Hollister et al. | 73/159 |
| 3,439,536 | 4/1969 | Cushman | 73/37.7 X |
| 3,496,744 | 2/1970 | Mizuno et al. | 73/37.7 X |
| 3,538,765 | 11/1970 | Jesinghaus et al. | 73/144 |

FOREIGN PATENTS OR APPLICATIONS

| 445,761 | 4/1936 | Great Britain | 73/144 |
| 1,160,112 | 7/1969 | Great Britain | 73/37.6 |

*Primary Examiner*—Charles A. Ruehl
*Attorney*—Alan Swabey

[57] ABSTRACT

A device for measuring local tension or modulus of elasticity of web comprising a vacuum chamber into which a portion of the width of the web is drawn and the deflection of the web into the chamber measured to provide a measurement of the tension and to a pair of such devices having cavities of different widths operating together and the outputs compared to obtain a reading of the local modulus of elasticity of the web being tested.

16 Claims, 4 Drawing Figures

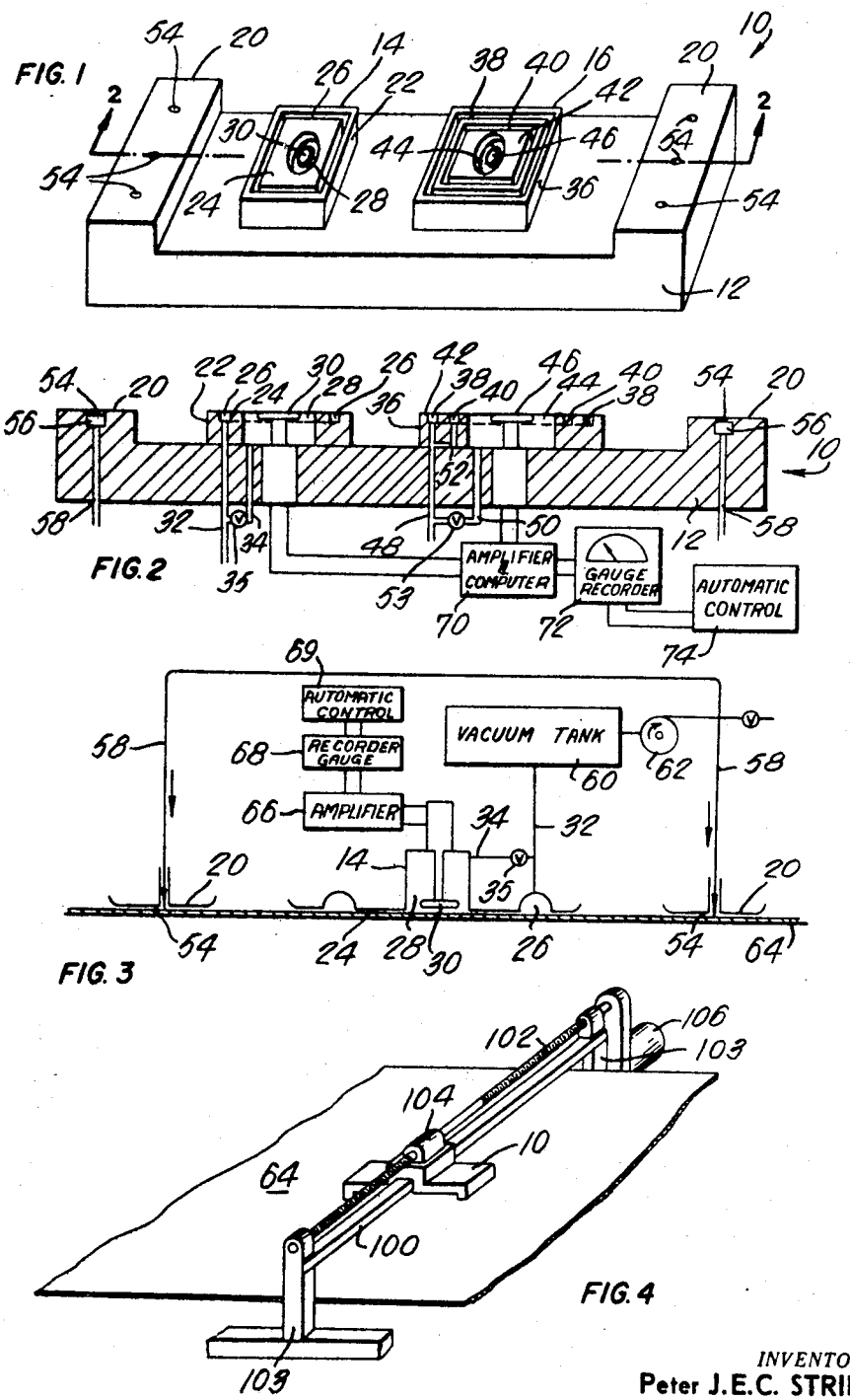

ns larger. In the illustrated arrangement the cavities 28 and 44 are of different sizes.

PAPER MACHINE TENSION TESTER

BACKGROUND OF THE INVENTION

1. Field of the Invention

The present invention relates to a tension tester. More specifically, the present invention relates to a tension tester capable of continuously indicating localized tension in a moving web, for example, on a paper machine. Even more specifically, the present invention relates to a testing device capable of providing a continuous indication of the elastic modulus of a web.

2. Description of Prior Art

The concept of measuring tension using a vacuum chamber is not entirely new. For example, it has been proposed to draw the full width of a web down into a vacuum chamber to direct light across the chamber and thereby detect the degree of deflection of the web into the chamber and obtain an indication of the total web tension. Such a device is satisfactory for some applications, but does not provide an indication of the localized web tension as required to adjust the operations of a machine.

Until recently, the localized tensions and variations in a web could not be measured due to lack of the necessary instrumentation.

Another feature of the present invention is one-sided scanning measurement of localized tension and modulus of a travelling web.

The measurement of the modulus of elasticity of the paper web is extremely useful and a very important feature of the present invention. It is believed that this measurement can be used to control accurately or to give a more accurate indication of the physical characteristics of the web.

SUMMARY OF INVENTION

Broadly, the present invention relates to a testing device including a cavity having a mouth, means to withdraw air from the cavity, means to locate a web to be tested in position across the mouth of said cavity, said mouth being smaller in width than the web to be tested and means to sense the deflection of the web into the cavity. More specifically, the present invention comprises a pair of such devices in spaced relationship, wherein different forces are applied to the web from the two cavities, means for comparing the deflection of the web in the two cavities and for computing the modulus of elasticity of the web.

BRIEF DESCRIPTION OF DRAWINGS

Further features, objects, and advantages will be evident from the following detailed description of a preferred embodiment of the present invention taken in conjunction with the accompanying drawings in which:

FIG. 1 is a perspective view of a sensing device constructed in accordance with the present invention;

FIG. 2 is a section along the line 2—2 of FIG. 1 indicating part of the device schematically;

FIG. 3 is a schematic illustration of a tension tester constructed in accordance with the present invention; and FIG. 4 is an isometric view with parts omitted for clarity illustrating one means for traversing the sensing head across a web.

DESCRIPTION OF PREFERRED EMBODIMENTS

As shown in FIGS. 1 and 2, the sensing device 10 of the present invention comprises a main supporting frame or block 12 having, in the illustrated arrangement, a pair of sensing heads 14 and 16 thereon. At each end of the device 10 is a hold-down plate or the like 20.

The head 14 is formed from a block 22 having on its exposed surface 24 an inwardly extending peripheral groove or channel 26 and a cavity 28 centered within the area bounded by the groove 26 on the surface 24. In the center of the cavity 28 is a displacement transducer 30 or other similar device which can be connected to suitable equipment to indicate the tension or other characteristic depending on the specific function of the device as will be described in more detail hereinbelow. The groove 26 and cavity 28 are connected to a suitable source of vacuum such as vacuum tank 60 (see FIG. 3) via conduit 32 and branch conduit 34. A pressure regulating valve 35 is provided in the line 34 so that the degree of vacuum in the groove 26 is preferably slightly higher than in cavity 28.

A second sensing head 16 is formed from a block 36 and has a pair of concentric peripheral grooves or channels 38 and 40 on its exposed surface 42. A cavity 44 similar to the cavity 28 having a transducer or the like, measuring device 46 similar to the device 30, is centrally located within the area bounded by the peripheral grooves 38 and 40. The grooves 38 and 40 and cavity 44 are connected to a source of vacuum such as vacuum tank 60 via conduit 48 having branch lines 50 and 52. The line 50 to cavity 44 is provided with a pressure regulating valve 53 to maintain the pressure in cavity 44 slightly higher than in grooves 38 and 40.

The cavities 28 and 44 are of different sizes, i.e., have different mouth opening sizes or peripheries, more particularly minimum width, to permit measurement of the modulus of elasticity as will be described hereinbelow. Alternatively, the cavities may be the same size with each having a different vacuum; or the cavities may be of different size with each having a different vacuum.

The shape of the opening or mouth of the cavities 26 and 44 is also important. It has been found that the mouth of these cavities should be substantially oval-shaped with substantially straight side edges perpendicular to the direction of travel of the web joined by semicircles with the spacing between the straight edges determining the width of the cavity in the machine direction. This width should be preferably less than the length of the cavity in the cross-machine direction. If the ends of the cavities are not rounded, e.g., substantially semicircular at their ends, it has been found that the web may wrinkle at the corners, thereby greatly reducing the accuracy of the device.

It has been found that for paper a satisfactory width for the cavities 28 and 44 in the direction of the web travel is 1¼ inches and 1¾ inches, respectively, when measuring the modulus of elasticity of the web. Generally, the cavities should be at least about 1 inch wide for sufficient sensitivity, however, this depends on the transducer used, and should normally not exceed about 2 inches, since little is gained by making the cavities wider. For paperboard or stiffer web larger cavities may be necessary. In the cross direction, i.e., the long axis of the cavity, the mouth should be approximately twice the width dimension of the cavity measured in the direction of travel of the paper, i.e., the short axis of the cavity, to minimize error introduced to bending of the web at the ends of the cavities. If for some reason it should be desirable to measure cross-machine tension and modulus the cavity or cavities could be turned through 90°.

The number of grooves, such as grooves or channels 26, 38 and 40 arranged about cavities, such as 28 and 44, is not critical. In the illustrated embodiment, head 14 had a single groove, whereas head 16 had a pair of peripheral grooves.

The hold-down plates or surfaces 20 are provided with a plurality of orifices 54 (three shown on each) each connected to a distributing duct 56 which in turn is connected to a suitable source of air under pressure via conduits 58.

Operation will first be described with respect to the layout schematically shown in FIG. 3 and wherein a single cavity, say cavity 28, is used to measure the tension (where the elastic modulus or other properties of the paper which could affect the device's read-out are substantially constant) and then with respect to the dual cavity arrangement of FIGS. 1 and 2 to measure the elastic modulus (or the situation where the modulus or other property will affect the read-out).

As shown in FIG. 3, a vacuum pump or the like 62 withdraws air from tank 60 to maintain an adequate source of vacuum so that the porosity of the paper, or a variation in porosity, has a negligible effect on the results obtained. The vacuum tank 60 is connected via conduits 32 and 34 to the groove or channel 26 and the chamber 28. Preferably, the vacuum in grooves 26 will be greater than the vacuum in chamber 28 by about 2 inches water gauge. At the same time, air under pressure is pumped either from pump 62 or another source via conduits 58 through the orifices 54 in the plates 20.

A paper web 64 is passed across the surface of the plates 20 and the surface 24 of the sensing head 14. The jets issuing from the orifices 54 act on the web 64 to hold the web adjacent the surface of these plates 20 by a "coanda" effect, thereby maintaining the web in position. The web 64 may continuously travel over the head 14 and is held against the surface 24 by means of the vacuum in the peripheral groove 26 which also tends to prevent leakage of air into the chamber 28 other than through the web. The vacuum in chamber 28 deflects the web 64 into the chamber and displaces the sensing element of the displacement transducer 30 which develops an output in accordance with the displacement. The amount of displacement of the web 64 into the cavity 28 is approximately proportional to the tension in the web, for any particular modulus, and thus the displacement transducer 30 can be calibrated to read tension directly and the signal generated may be amplified by amplifier 66 to operate a recording gauge 68 to directly indicate tension. If desired, the output can also be connected to an automatic control means 69 to automatically regulate an operation of the machine on which the web is travelling.

If modulus of elasticity is not substantially constant or if it is to be measured, two cavities, such as cavities 28 and 44 of different open area, must be used and preferably, for accuracy, should be aligned in the direction of web travel so that each will measure in the same location along the web. It can be shown for each cavity 28 or 44 that $$T = (Pw^2/8h) - (8eh^2/3w^2)$$

where
 $T$ = tension in lbs. per lineal inch
 $w$ = chamber width in the direction of travel (minimum width) in inches
 $P$ = the vacuum in the chamber in psi
 $h$ = the maximum deflection of the paper into the cavity (inches)
 $e$ = modulus in pounds per lineal inch.

By using two cavities of different widths and simultaneously solving a pair of such equations, a direct reading for each of the tension and modulus of elasticity of the web can be obtained.

In the arrangement of FIGS. 1 and 2, the displacements of the transducers 30 and 46 are amplified and compared in computer 70 and the output is directed to gauges or recorders 68 and 72 to indicate continuously the modulus of elasticity of the web. If desired, the output from the computer 70 can be connected to an automatic control 74 to regulate automatically a function of the machine on which the web is travelling in accordance with the values sensed.

Preferably, the head 10 will be mounted to traverse the paper web 64 and obtain readings of tension and modulus across the web. One device for scanning the web has been shown in FIG. 4. As shown in this figure, the head 10 is suspended from a bar 100 which is supported above the web 64 on posts 103 and which also supports a threaded rod 102. The threaded rod 102 threadably engages a boss 104 forming part of the mounting of the head 10 on the bar 100 so that as the rod 102 is turned, the head 10 is moved back and forth across the web 64. A suitable drive means for rotating the threaded rod 102 is indicated at 106. Any suitable flexible connections may be used to connect the vacuum and air pressure lines to the head 10.

While only a single measuring device for measuring tension and modulus has been shown, it is evident that a plurality of such devices can be positioned across the web for simultaneous reading of the characteristics of the web at localized points across the width of the web.

The disclosure has dealt primarily with apparatus for measuring tension and/or modulus. Once these parameters are known, the device can also be used to provide an indication of the mullen which may be derived from the modulus and tension by a calculation. Similarly, bulk modulus and tension measured in p.s.i. can be calculated, if the caliper of the web or sheet is known, using the tension and modulus obtained from the basic apparatus. Also, stretch or elongation may be obtained from a plot of the tension and modulus. Thus, there are a plurality of further characteristics that may be obtained from the basic apparatus described above and the apparatus may be revised by providing a multiplicity of cavities and suitable computing equipment to provide direction indications of any of these characteristics.

In the above, the vacuum level has been kept constant and variations in the depth of deflection of the web has been measured to indicate tension and/or elastic modulus. Where desirable, this same objective may be accomplished with the above device by merely maintaining a constant web deflection and measuring the level of vacuum necessary to maintain this constant deflection (as before, variations in porosity, etc. are taken care of by the ability of the vacuum-creating equipment to handle varying flows of air).

The disclosure hereinabove is directed primarily to the use of a vacuum chamber for deflecting the web. It will be apparent that the principle of differential in pressure between opposite sides of the web may be obtained by other means, for example, by a positive pressure using suitable means to confine the area of the web deflected.

Modifications may be made in the device as disclosed without departing from the spirit of the invention as defined in the appended claims.

We claim:

1. A testing device for measuring the characteristic of a web in a desired direction comprising a head, a cavity having a mouth opening in said head wherein said mouth opening is substantially oval-shaped and the long axis of said oval-shape is substantially perpendicular to the direction in which said characteristic is being tested, to have a greater sampling area along said long axis, means for drawing a vacuum in said cavity for drawing a portion of said web into said cavity and means for sensing the deflection of said web into said cavity and measuring the said characteristic of said web.

2. A device as defined in claim 1 wherein said means for sensing the deflection of said web adjusts said means for drawing a vacuum to maintain said deflection substantially constant and wherein said characteristic of said web is measured by measuring the degree of vacuum applied to said cavity.

3. A device as defined in claim 1 further comprising a peripheral channel surrounding said cavity, means connecting said channel to a source of vacuum to hold said web.

4. A device as defined in claim 1 wherein said long axis of said oval is at least twice the short axis of said oval.

5. A device as defined in claim 1 further comprising a pair of plates, one on each side of said cavity, orifices in said plates, means for directing jets of air through said orifices to hold said web adjacent said plates by a "coanda" effect.

6. A device as defined in claim 1 further comprising a peripheral channel surrounding said cavity, means connecting said channel to a source of vacuum to hold said web, a pair of plates one at each side of said cavity, orifices in said plates, means for directing jets of air through said orifices to hold said web adjacent said plates by a "coanda" effect.

7. A testing device for testing characteristics of a web comprising a pair of pneumatic deflecting means for pneumatically deflecting a web, said means being positioned in spaced apart relationship, means for restricting the area of said web deflected by each of said deflecting means, means for independently sensing the deflection caused by each of said deflecting means, said areas of said web being less in dimension in each direction than that of the web, said means for restricting the area of said web of each said deflecting means comprising a cavity having a mouth opening, the mouth of one of said cavities of one of said deflecting means being larger than the mouth of the cavity of the other deflecting means.

8. A testing device for testing characteristics of a web comprising a head, a pair of cavities each having a mouth opening in said head, means for drawing a vacuum in said cavities for drawing a portion of said web into each of said cavities, means for positioning said web adjacent said cavities, said mouth openings of said cavities being relatively small compared with the width of said web whereby only local areas of said web are deflected into said cavities, the mouth of one of said cavities being larger than the mouth of the other of said cavities, and means for sensing the deflection of said web into each of said cavities and for comparing the deflection in each of said cavities and computing the said characteristics of said web.

9. A device as defined in claim 8 further comprising a peripheral channel surrounding said cavity, means connecting said channel to a source of vacuum to hold said web against said head.

10. A device as defined in claim 8 wherein said mouth opening is substantially oval-shaped.

11. A device as claimed in claim 10 wherein the long axis of said oval is at least twice the short axis of said oval.

12. A device as defined in claim 10 further comprising a pair of plates, one on each side of said head, orifices in said plates, means for directing jets of air through said orifices to hold said web adjacent said plates by a "coanda" effect.

13. A method of measuring localized tension in a particular direction of a continuously moving web, at a particular modulus, comprising drawing a small portion of said web into a first cavity by means of a vacuum, sensing the deflection of said web into said first cavity, and indicating the tension in said web in accordance with the deflection of said web into said first cavity, drawing a second small portion of said web into a second cavity by means of vacuum in said second cavity said second cavity being of different size than said first cavity and aligned with said first cavity so that each said cavity will measure in the same location along the web, sensing the deflection of said web into said second cavity, and indicating the tension in said web in accordance with the deflection of said web into said second cavity.

14. A method as defined in claim 13 further comprising directing jets of air in each axially opposed outside edge region of said cavities to create a "coanda" effect in each said region.

15. A testing device for testing the characteristics of a web comprising a head, a cavity having a mouth opening in said head, means for drawing a vacuum in said cavity for drawing a portion of said web into said cavity, a channel adjacent said cavity, means for drawing a vacuum in said channel for drawing said web against said cavity, and means for sensing the deflection of said web into said cavity and measuring the said characteristics of said web.

16. A method of measuring localized tension in a continuously moving web, at a particular modulus, comprising drawing a small portion of said web into a cavity by means of vacuum, further drawing said web about the periphery of said cavity by means of a vacuum in a peripheral channel, sensing the deflection of said web into said cavity, and indicating the tension in said web in accordance with the deflection of said web into said cavity.

* * * * *